May 10, 1960

L. CHALKLEY 2,936,276

PHOTOCHEMICAL COMPOSITIONS AND PROCESSES
UTILIZING SALTS OF PARA-AMINO
TRIPHENYLACETONITRILES

Filed June 25, 1957

ROSANILINE CYANIDE 2.5 × 10⁻⁵ MOLAR IN i-PROPYL ALCOHOL
A = NEUTRAL
B = N/10 HCl

FORMYL VIOLET CYANIDE 2.25 × 10⁻⁵ MOLAR IN WATER
A = NEUTRAL
B = N/10 HCl

INVENTOR
Lyman Chalkley

BY
Bacon & Thomas

ATTORNEYS

CRYSTAL VIOLET CYANIDE 2.5 × 10⁻⁵ IN
i-PROPYL ALCOHOL
A = NEUTRAL
B = N/10 HCl

ETHYL GREEN CYANIDE 2.5×10⁻⁵ MOLAR IN WATER
CURVE A AT pH 6.5
CURVE B AT pH 2.3

May 10, 1960

L. CHALKLEY 2,936,276

PHOTOCHEMICAL COMPOSITIONS AND PROCESSES UTILIZING SALTS OF PARA-AMINO TRIPHENYLACETONITRILES

Filed June 25, 1957

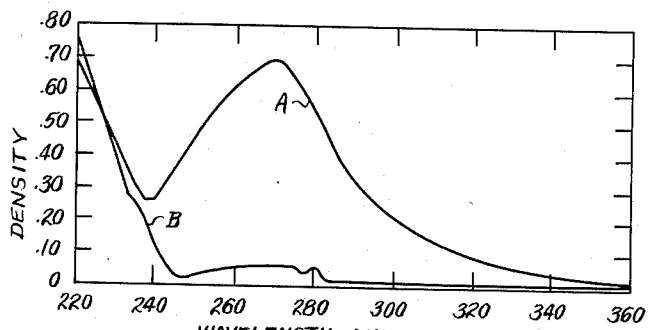

*Fig. 9.*

XYLENE BLUE VS CYANIDE IN WATER 2.5×10⁻⁵ MOLAR
CURVE A AT pH 11.3
CURVE B AT pH 2.5

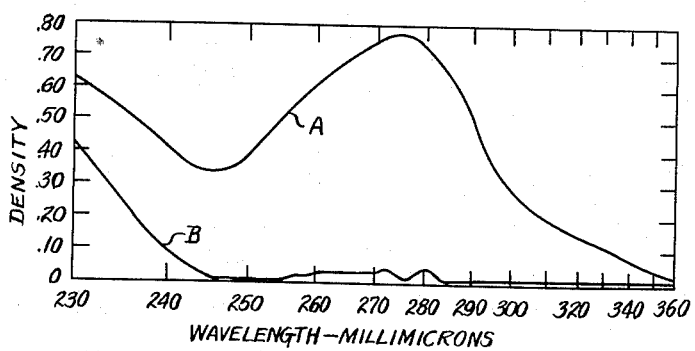

*Fig. 8.*

XYLENE BLUE AS CYANIDE 2.5×10⁻⁵ MOLAR IN WATER
A = NEUTRAL
B = N/10 HCl

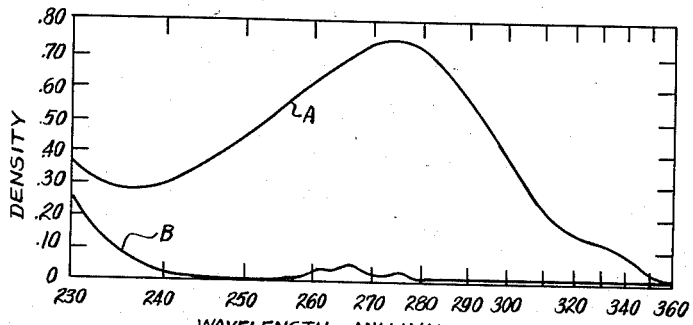

*Fig. 7.*

ERIOGLAUCINE CYANIDE APPROX. 2.5×10⁻⁵ MOLAR IN WATER
A = NEUTRAL
B = N/10 HCl

INVENTOR
Lyman Chalkley

BY
Bacon & Thomas
ATTORNEYS

A—PATENT BLUE V CYANIDE AT pH9 5mg IN 50ml; DILUTED 1:10
B—PATENT BLUE V CYANIDE AT pH4 5mg IN 50ml; DILUTED 1:10

A—FAST ACID VIOLET CYANIDE AT pH7 5mg IN 50ml
B—FAST ACID VIOLET CYANIDE AT pH3 5mg IN 50ml

INVENTOR.
Lyman Chalkley
BY
Bacon & Thomas
ATTORNEYS

United States Patent Office 2,936,276
Patented May 10, 1960

2,936,276

PHOTOCHEMICAL COMPOSITIONS AND PROCESSES UTILIZING SALTS OF PARA-AMINO TRIPHENYLACETONITRILES

Lyman Chalkley, Prince Georges County, Md.

Application June 25, 1957, Serial No. 667,747

16 Claims. (Cl. 204—158)

This invention relates to a photochemical process and product and, more particularly, to photochemical reactions of salts of colorless cyanides of triphenyl methane dyes having at least one amino group para to the central methane carbon atom, and to photosensitive products containing the salts of such dye cyanides. The invention takes advantage of the fact that the absorption characteristics of the salts of the para-amino dye cyanides differ from those of the compounds in free amino form.

It has long been known that certain of the colorless para-amino derivatives of the triphenylacetonitriles, i.e., the dye cyanides, when combined with a suitable photoactivator, may be converted into colored compounds by irradiation with ultraviolet and shorter wave lengths, but show little or no sensitivity to visible light. Because of this property, these substances may be used in solution or absorbed or coated on a suitable base in the presence of an activator for recording and measuring radiation in the ultraviolet region. However, such photochemical reactions have been carried out in the past only with systems in which the dye cyanide was in a free state and not neutralized by acid to form a salt. While strong acids have been used in photosensitive dye cyanide systems, e.g. to prevent hydrolysis of the colored compounds to colorless forms due to alkaline conditions, care has been taken to keep the acidity below that at which the absorption spectra of either the dye or corresponding dye cyanide would be affected. In dye cyanide photochemical processes and products, salt formation has been carefully avoided because it had been previously reported and generally believed that the salts of the dye cyanides were insensitive to radiation, and could not be used in photosensitive systems. Thus, Lifschitz and Joffe, "Zeitschift für Physikalische Chemie," vol. 97, 1921, page 431, stated that photochemical reaction of dye cyanides did not take place at all in aqueous mineral acid solution. In the processes described in my previous U.S. Patents, 2,441,561 and 2,528,496, the carboxylic acids were found to be suitable activators for the hydrophobic types of the dye cyanides disclosed, but they were too weakly ionized to form salts with the dye cyanide amino groups.

Likewise, when salts of dye cyanides have been used in the past to compound photosensitive systems they have always been combined with water, which causes hydrolysis with reformation of the basic free amino form, and preferably with some alkaline or buffering agent to neutralize the strong acid, such as the collagenous protein employed in my copending application Serial Number 547,338, filed November 16, 1955, now Patent No. 2,829,052, issued April 1, 1958.

It has now been discovered that the salts of the para-amino dye cyanides, including those of the previously known hydrophobic type as well as of new hydrophilic types disclosed in my copending application, Serial Number 550,773, filed December 2, 1955, now abandoned, are photosensitive and may be utilized in a very beneficial manner in photochemical processes, systems and products. They are particularly useful for actinometric determinations of radiant energy in regions of the spectrum having different limits than those which can be measured by the free amino compounds.

It has further been discovered that colorless forms of dyes are in some instances formed as a result of exposure of the salts in certain media to wave lengths to which they are sensitive, but that such colorless forms can be readily converted to colored compounds which are stable.

Accordingly, an object of the present invention is to provide new photochemical methods, systems and compositions utilizing the salts of dye cyanides.

Another object of the present invention is to provide dye cyanide salt compositions and/or systems which have different absorption characteristics than the previously known forms of dye cyanides.

Another object of the invention is to provide a method for converting colorless systems containing irradiated salts of dye cyanides to systems of stable color whereby the extent of photochemical reaction can be determined.

Another object of the invention is to provide photochemical processes and systems utilizing the unique sensitivity ranges of the normal and monoacid salts of para-amino triphenylacetonitriles having a sulfonic acid group on a phenyl nucleus ortho to the point of attachment of the phenyl group to the central methane carbon atom.

Another object of the invention is to provide photosensitive processes, compositions and/or systems utilizing salts of dye cyanides which directly form relatively stable colored compounds upon irradiation at wave lengths in the ultraviolet region of the spectrum, but which are substantially unaffected by sunlight or by irradiation in the visible portion of the spectrum.

A still further object of the invention is to provide photosensitive films or sheet materials containing salts of para-amino dye cyanides and having sensitivity characteristics differing from those of the corresponding basic amino compound.

These and other objects of the invention are accomplished through use of the salts formed by the neutralization in the presence of an acid of at least one of the amino groups of a triphenylmethane dye cyanide having at least one amino group on a phenyl nucleus in a position para to the central carbon atom. These salts may be formed, in general, by the treatment of any of the well-known hydrophobic type para-amino triphenylmethane dye cyanides, such as those disclosed in my prior Patents 2,441,561 and 2,528,496, as well as the new hydrophilic types disclosed in my copending application Serial Number 550,773, in suitable solvent medium with a sufficient concentration of an acid which is sufficiently highly ionized to effect salt formation with the amino group or groups of the particular para-amino dye cyanide treated. In water, the normal salts may be formed by the use of acids having an ionization constant greater than $1 \times 10^{-3}$. Strong mineral acids, such as hydrochloric or sulfuric are suitable for this purpose. Most of the para-amino triphenylacetonitriles will form normal salts in 1/10 Normal HCl. Other suitable strong acids include perchloric, p-toluenesulfonic, and hydrobromic. Weakly ionized acids, including such carboxylic acids as acetic, propionic, tartaric, citric, benzoic, and other weakly acidic substances, do not readily form normal salts of the dye cyanides, although they may be utilized as solvents or activators for the salts of the dye cyanides with stronger acids in a manner similar to that disclosed in my Patent 2,441,561 for the basic dye cyanides. However, the monoacid salts of the new water-soluble hydrophilic para-amino dye cyanides having a sulfonic acid group on a phenyl nucleus at a position ortho to the central methane carbon atom, described in Serial Number 550,773 and hereinafter designated as dye cyanides of the Patent Blue type, may be formed in the presence of such weakly ionized acids.

In the aforesaid copending application, Serial Number 550,773, it further is disclosed that certain of the new hydrophilic dye cyanides, e.g., Acid Fuchsin Cyanide upon irradiation with ultraviolet, form stable colored compounds characteristic of the free amino form of the dye, even though they are used in solutions of relatively high acidity, e.g., 0.1 normal HCl, i.e., the free amino groups of these particular compounds are not as readily neutralized by acids as are the free amino groups of the other para-amino dye cyanides. However, it has been found that these as well as the other hydrophilic types of dye cyanides form normal salts in acid solutions containing a highly ionized acid in sufficient concentration, and that such salts exhibit different absorption characteristics from the free amino compounds.

It has also been disclosed in my copending application, Serial Number 664,113, now Patent No. 2,864,752, issued December 16, 1958, that Patent Blue V Cyanide and Fast Acid Violet 10B Cyanide each have several sensitivity ranges separated from each other by a difference of acidity. Thus, Patent Blue V Cyanide in acid solution at pH 3 or 4, attainable by use of the weakly ionized carboxylic acids, shows negligible absorption at wave lengths of 3000 A. and higher, whereas in alkaline solution Patent Blue V Cyanide continues to absorb up to about 3700 A. This is attributed to the fact that the amino groups are free under alkaline conditions, but one amino group is converted into a salt at a pH of about 4. It has now been determined that the remaining free amino group or groups may be converted to salts under more highly acid conditions to form compounds having a still further shift in absorption characteristics. The formation of the monoacid salts at an intermediate acidity range is a unique property of the para-amino triphenylacetonitriles having a sulfonic acid group attached to the phenyl nucleus in the ortho position with respect to the central methane carbon atom. These dye cyanides, designated herein as the Patent Blue type, include Xylene Blue VS Cyanide, Xylene Blue AS Cyanide, Patent Blue V Cyanide, Erio Glaucine Cyanide, Fast Acid Violet 10B Cyanide, Food, Drug and Cosmetic Green No. 3 Cyanide, and Xylene Cyanol F.F. Cyanide. The use of the monoacid salts as well as the normal salts of such dye cyanides is within the scope of the present invention.

Examples of other hydrophilic type dye cyanides which may be utilized only in the form of their normal salts are: Helvetia Green Cyanide, Guinea Green Cyanide, Formyl Violet S4B Cyanide, Ethyl Green Cyanide, Methyl Green Cyanide, Malachite Green Monochloro-Ethylate Cyanide, and Malachite Green Iodo-Ethylate Cyanide.

Examples of hydrophobic dye cyanides of which normal salts only can be formed are: Rosaniline Cyanide, Pararosaniline Cyanide, Crystal Violet Cyanide, Malachite Green Cyanide and Brilliant Green Cyanide.

In comparison with the corresponding basic or unneutralized amino dye cyanides, the upper limits of sensitivity for compositions, solutions, or systems containing the normal acid salts of such cyanides, in general, are shifted to a lower region of the spectrum, generally below 3100 A. with maximum sensitivity in some instances appearing below about 2400 to 2500 A. The normal salts or solutions and systems utilizing such salts show little or no sensitivity to sunlight, but may be photo-activated by radiation of shorter wave lengths. The monoacid salts, however, may absorb at longer wave lengths extending, in some instances, to the long wave length ultra-violet as in the case of the monoacid salt of Fast Acid Violet 10B Cyanide. The ranges of sensitivity follow the absorption characteristics, and are illustrated by the absorption curves plotted in the graphs shown in the accompanying figures of the drawing, wherein Figure 1 is a graph comparing the absorption spectrum of a neutral alcoholic solution of Rosaniline Cyanide with the absorption spectrum of an acidic alcoholic solution in which Rosaniline Cyanide is present as the normal salt.

Figure 7 is a graph comparing the absorption spectrum of a neutral aqueous solution of Erio Glaucine Cyanide with the absorption spectrum of an acidic aqueous solution (1/10 N HCl) in which the Erio Glaucine Cyanide is present as the normal salt.

Figure 8 is a graph comparing the absorption spectrum of a neutral aqueous solution of Xylene Blue AS Cyanide with the absorption spectrum of an acidic aqueous solution (1/10 N HCl) in which Xylene Blue AS Cyanide is present as the normal salt.

Figure 9 is a graph comparing the absorption spectrum of an alkaline aqueous solution of Xylene Blue VS Cyanide with the absorption spectrum of an acidic aqueous solution (pH 2.5) containing the Xylene Blue VS Cyanide in the form of its normal salt.

Figure 1:
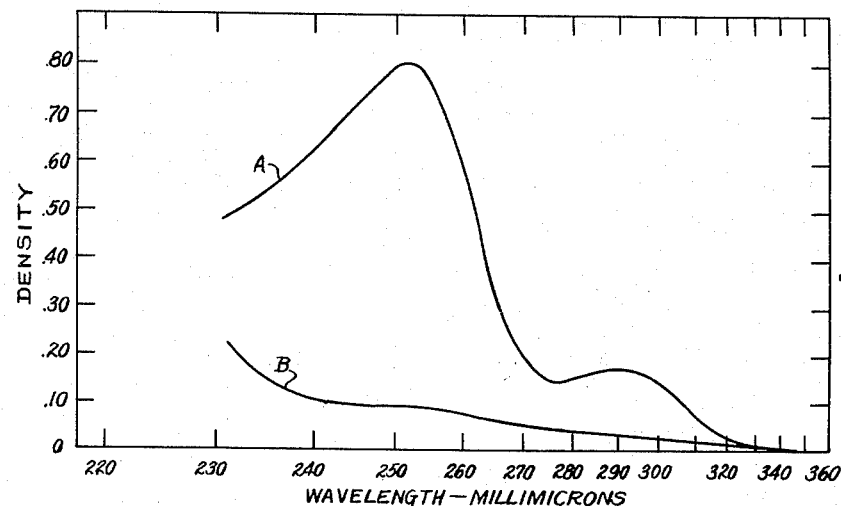
Figure 2:
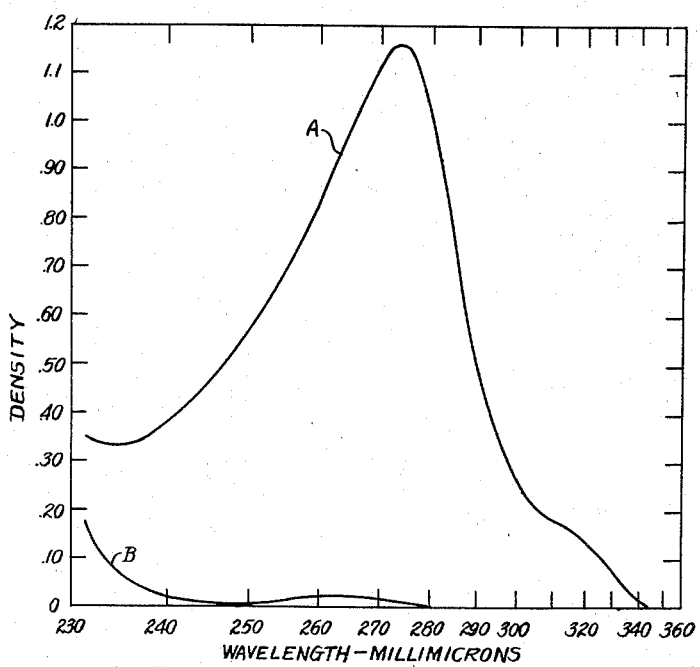
Figure 2 is a graph comparing the absorption spectrum of a substantially neutral aqueous solution of Formyl Violet S4B Cyanide with the absorption spectrum of an acidic aqueous solution in which the Formyl Violet S4B Cyanide is present as the normal salt.
Figure 3:
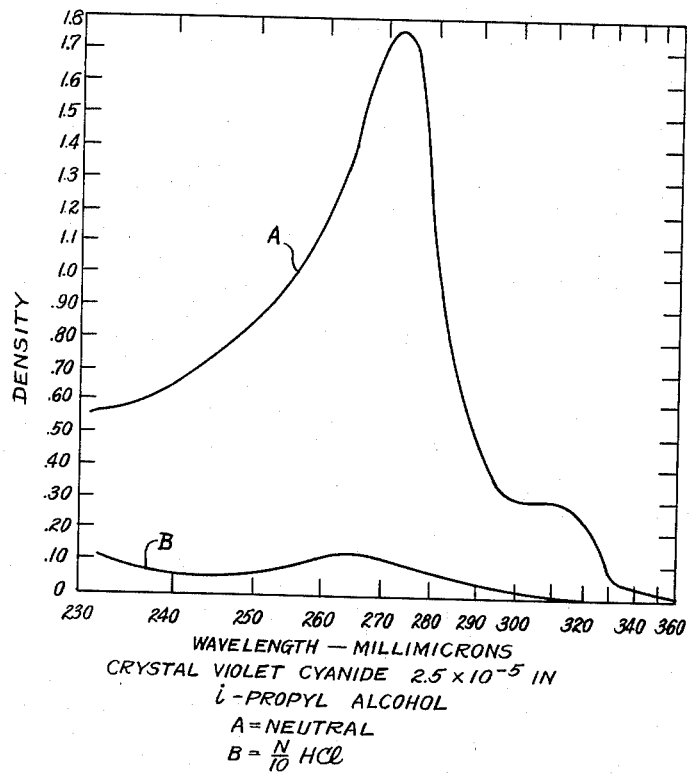
Figure 3 is a graph comparing the absorption spectrum of a neutral alcoholic solution of Crystal Violet Cyanide with the absorption spectrum of an acidic alcoholic solution in which the Crystal Violet Cyanide is present as the normal salt.
Figure 4:
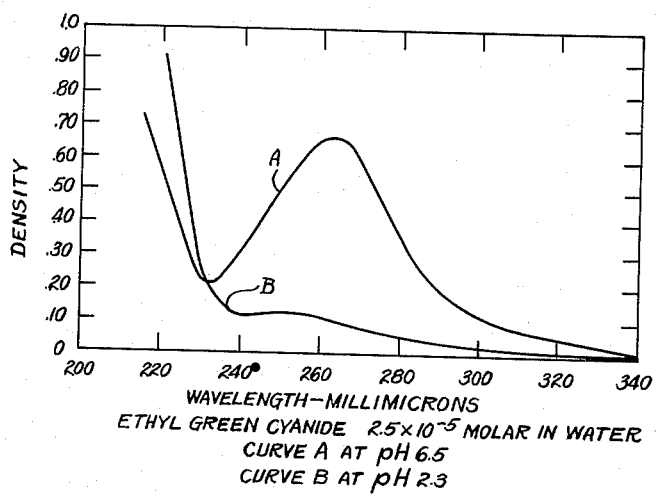
Figure 4 is a graph comparing the absorption spectrum of a substantially neutral aqueous solution of Ethyl Green Cyanide with the absorption spectrum of an acidic aqueous solution in which the Ethyl Green Cyanide is present as the normal salt.
Figure 5:
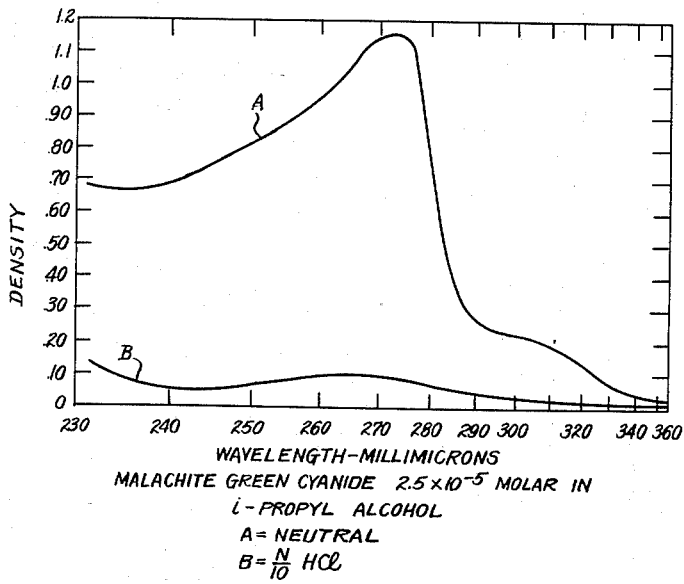
Figure 5 is a graph comparing the absorption spectrum of a neutral alcoholic solution of Malachite Green Cyanide with the absorption spectrum of an acidic alcoholic solution in which Malachite Green Cyanide is present as the normal salt.
Figure 6:
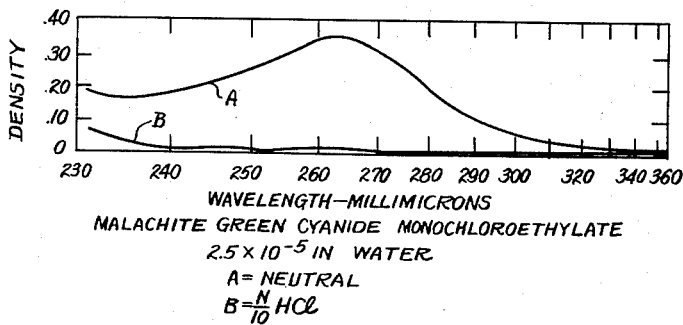
Figure 6 is a graph comparing the absorption spectrum of a substantially neutral aqueous solution of Malachite Green Cyanide Monochloro-Ethylate with the absorption spectrum of an acidic aqueous solution in which the Malachite Green Cyanide Monochloro-Ethylate is present as the normal salt.

Referring now specifically to the figures of the drawing, it will be seen that the neutral or basic form of each of the dye cyanides whose absorption spectra are illustrated by the curves A has an absorption band with a peak between 2500 and 3000 A. and exhibits a maximum wave length sensitivity in the order of 3200 A. or higher. In the normal salts, as illustrated by the the lower curves B in Figs. 1–9, the absorption band which characterized the free amino groups of the previously known photosensitive state of the dye cyanides has virtually disappeared. Moreover, the maximum wave length sensitivity has shifted to below 2400 A. In the curves B of Figs. 10 and 11, wherein the acidity of the solution was insufficient to convert the Patent Blue type Cyanides to normal salt form so that the monosalts are present, the wave-band characteristic of free amino groups is still present but the solution absorbs less strongly in such region. The general absorption characteristics, moreover, have changed. Thus, in Fig. 10 the absorption peak 10 of curve B corresponds generally to the absorption peak 12 of curve A, but has shifted toward the longer wave length region of the ultraviolet, and there is no absorption above 3000 A. In Fig. 11 the acid solution absorbs more strongly above 3600 A. than the neutral solution.

The salts of the dye cyanide amino groups are ionized and are hydrophilic. Thus, the conversion of a dye cyanide—whether of the hydrophobic or hydrophilic types—into a salt adds one or more hydrophilic groups to the molecule, and, as with other hydrophilic dye cyanides, the product may be photoactivated by water or by hydrocolloids, as shown in my copending application, Serial Number 542,479, now Patent No. 2,855,303, issued October 7, 1958. The dye cyanide salts may also be photoactivated by alcohols or carboxylic acids.

While all of the salts of the dye cyanides have the common property of being photochemically active in the presence of a suitable activator over a different wave length range than the corresponding free amino dye cyanides, different conditions during and subsequent to the photolysis may be employed with certain types of dye cyanide salts to provide different results as to color formation. All of the compounds may be employed in photochemical processes to form directly colored compounds under conditions in which the salts are the only form of the dye cyanide present, and in which the photoreaction is carried out in a nonaqueous photoactivating medium that is free of hydroxyl, alkoxyl, and other groups which react with triphenylmethane dyes to form colorless compounds such as carbinols, ethers, and the like. Thus, all of the normal salts may be utilized with carboxylic-acid type photoactivators, as disclosed in my Patent 2,441,561, to form a colored compound directly. For example, in glacial acetic acid all of the dye cyanide salts are readily photolyzed by exposure to sufficiently short wave lengths to form directly a relatively stable color. In general, the colored product will not have the color of the dye corresponding to the dye cyanide, but instead will usually show the color of a salt of the dye. Thus, the product formed by irradiation of a salt of Crystal Violet Cyanide with a strong acid in acetic acid solution may be green. Under some conditions, altogether new products may be formed. Thus, Malachite Green Cyanide in quite dilute solution in acetic acid acidified with perchloric acid yields on irradiation at wave lengths below 2900 A. a brown color that is not directly convertible into Malachite Green.

The salts of dye cyanides which readily form carbinols, may show little permanent visible change when acted upon by irradiation at short wave lengths when in aqueous solutions. This would account for the fact that the photolysis of the solutions of the salts was not previously recognized. Illustrative of these salts are those of the hydrophobic type and hydrophilic type other than the Patent Blue group. For example, a dilute aqueous solution of the trihydrochloride of Pararosaniline Cyanide or of Crystal Violet Cyanide on irradiation with, say, 2537 A. may undergo no visible change. However, the salt of the dye cyanide apparently is photochemically converted into the trihydrochloride of 4, 4′, 4″ triamino-triphenylcarbinol or of 4, 4′, 4″ tris dimethylamino-triphenylcarbinol, respectively, and the corresponding dye can be obtained from the carbinol salts by neutralization of the excess acid with an alkali. The mechanism of this reaction is illustrated by the following equations:

EQUATION NO. 1

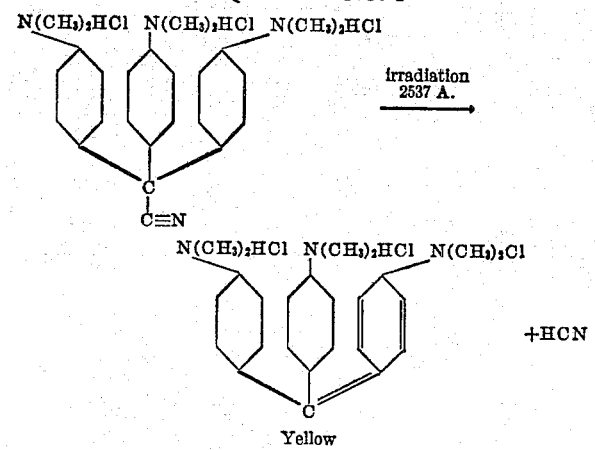

EQUATION NO. 2

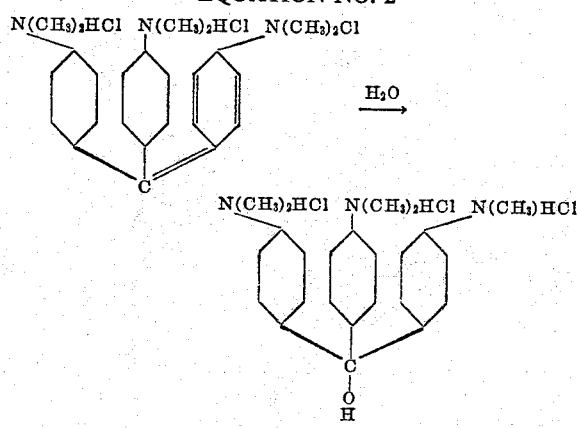

EQUATION NO. 3

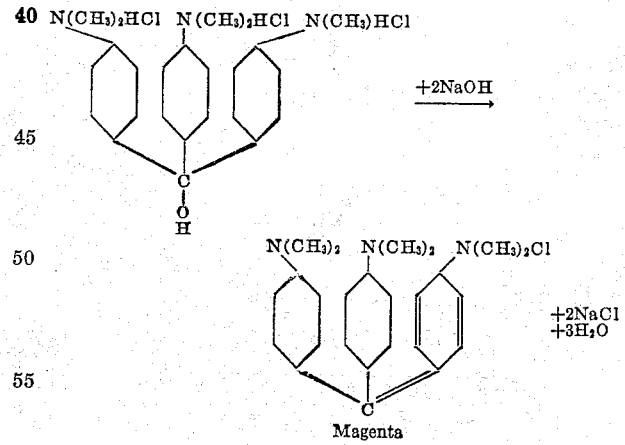

As shown by the foregoing equations, on exposure to wave lengths short enough to be absorbed by the dye cyanide salt, the salt is converted to a salt of the dye (Equation No. 1), which reacts with water to form the colorless carbinol in accordance with Equation No. 2. When enough acid is neutralized by addition of a base to reduce the acidity to a value at which the dye is stable, then the colorless derivative in Equation No. 2 reverts to the parent dye in accordance with Equation No. 3. Thus, according to this feature of the invention, a solution of the normal salt of an amino-triphenylmethane dye cyanide which is readily capable of forming carbinols with water, is irradiated by wave lengths shorter than 2900 A. to print a latent color or image which may be developed at any later time by treatment with a suitable base or buffer solution, such as sodium acetate, sodium propionate, etc. Volatile bases such as ammonia or trimethylamine, may also be used as the developer.

It is essential that all of the dye cyanide actually be in the form of a salt in the system that is irradiated. The basicity of the para-amino dye cyanides is so low that it falls within the range of many common solvents such as water and the alcohols. In such basic solvents, stoichiometric ratios of the dye cyanide and acid have little meaning, for the solvent competes with the dye cyanide for the acid. Thus, normal hydrochlorides of Malachite Green Cyanide and of Crystal Violet Cyanide, when placed in water decompose rather than dissolve. When placed in water, the water takes up some of the hydrochloric acid, and the dye cyanides may be precipitated as free bases. The trihydrochloride or normal salt of the more basic Pararosaniline Cyanide is soluble in water, but in solution is also reduced to basic salts. The adsorption spectra of such systems and also photochemical reactivity show little difference from systems of basic dye cyanides in which all of the amino groups are free. Accordingly, it is necessary in aqueous or alcoholic systems to provide excess acid in order to maintain the dye cyanides in the form of their normal salts. An acidity of about pH 1 is generally sufficient. However, it is easy to determine the exact acidity at which only the normal salt is present and all of the amino groups have been neutralized by acid. This condition is determined by following the neutralization spectroscopically. The absorption spectra illustrated in the Figures 1 to 9 of the drawing show that the acid cyanides are, in fact, acid-base indicators in the ultraviolet. All that is necessary to establish the formation of the normal salt is the extinction by acid of the free amino group absorption band which has a peak lying substantially between 2500 and 3000 A. This method can be used whether the photosensitive system is a liquid or a solid film in a hydrocolloid such as polyvinyl alcohol or carboxy methyl cellulose.

When a film is prepared for use according to the invention, it is important to establish the complete neutralization of the amino groups in the film as actually used, rather than in the solution from which the film is cast, because the hydrogen ion activity of a mixture may change substantially as water is withdrawn from it.

In most of the di- and tri- para-amino triphenylacetonitriles the two or three amino groups in the molecule have the same basicity, and basic salts of the type of

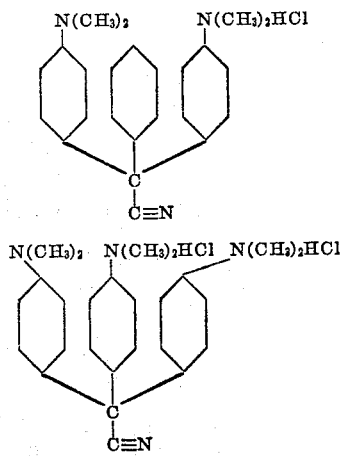

do not appear to be capable of unique existence. These dye cyanides in presence of acid exist in only two chemically distinct forms, the base and the normal salt. The intermediate stages behave spectroscopically and chemically as mixtures of the base and normal salt.

Figure 10:
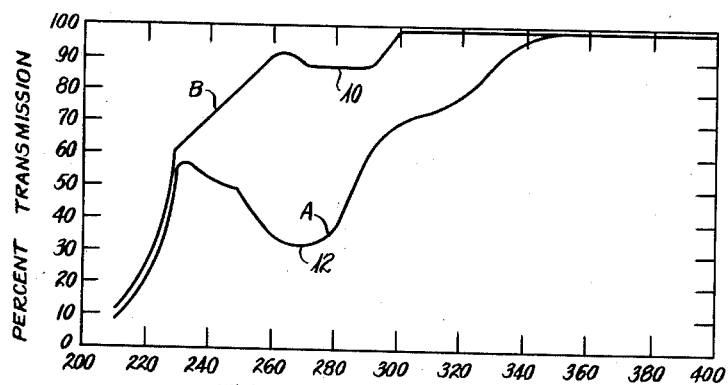
Figure 10 is a graph comparing the absorption spectrum of an alkaline aqueous solution of Patent Blue V Cyanide with the absorption spectrum of an acidic solution (pH 4) in which the Patent Blue V Cyanide is present as the monoacid salt. The curves in this figure show wave length vs. percent of transmission.
Figure 11:
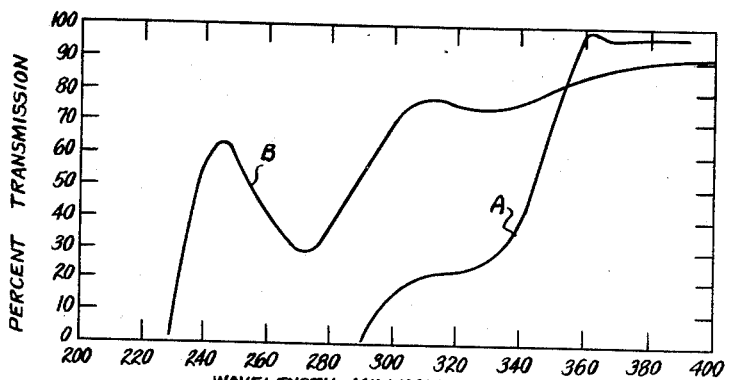
Figure 11 is a graph comparing the absorption spectrum of a neutral equeous solution of Fast Acid Violet 10B Gyanide with the absorption spectrum of an acidic aqueous solution (pH3) in which the Fast Acid Violet 10B Cyanide is present as the monoacid salt. The curves in this figure show wave length vs. percent of transmission.

However, the polyamino triphenylacetonitriles having a sulfonic acid group in a position ortho to the central methane carbon atom are capable of forming distinct monoacid salts, as demonstrated by Figures 10 and 11, showing the contrasting absorption spectra. These also have photochemical properties distinctly different from those of both the normal salts and of the compound with free amino groups. These Patent Blue type dye cyanides behave as though one amino group were more basic than the others, and this forms a stable, basic monoacid salt at lower acidity than is required to form the normal salt.

The invention is further illustrated by the following examples of practice:

Example 1

The actinometric determination of short-wave ultraviolet in presence of longer wave-length radiation is carried out as follows: A $5 \times 10^{-5}$ molar solution of Formyl Violet Cyanide (a new hydrophilic dye cyanide of the dye Formyl Violet S4B having the Colour Index No. 698, not of the Patent Blue type and more completely described in copending application Serial Number 550,773), in N/10 aqueous hydrochloric acid is exposed in a flat-bottomed dish to the radiation to be measured in such a manner that the radiation impinges directly on the surface of the solution without passing through intervening matter. During the exposure the solution is stirred, e.g., with a magnetic stirrer. If the radiation is intense, a pale blue color will develop in the solution. If the radiation is weak, the solution may show no color change during exposure, because the solution is photo-tropic and the dye produced by irradiation is continuously fading.

The duration of exposure is determined by withdrawing a few drops of the solution from time to time, mixing the sample with an equal volume of 0.11 molar sodium acetate solution and heating the mixture to boiling. When a satisfactory violet color is obtained in this test the exposure is terminated.

After exposure, the irradiated solution is mixed with an equal volume of 0.11 molar aqueous sodium acetate solution to replace the hydrochloric acid by acetic acid, which is slightly buffered by excess sodium acetate. The mixture is heated to boiling to convert dye base into dye, cooled to 25° C. and held in a 25° thermostat for one hour. The violet dye, Formyl Violet S4B, in the solution is then determined colorimetrically using a 10 cm. long absorption cell and light of 5430 A. approximate wave length.

The yield of dye by this process is best standardized by initial preparation of a curve relating dye concentration in the final sample with exposures made by a calibrated lamp giving the type of spectrum or radiation to be measured.

When the radiation to be measured contains wave lengths shorter than about 1900 A. the light source, e.g., an ozone lamp, may be immersed directly in the photosensitive solution; or the atmosphere between the light source and the solution should be replaced by a gas transparent to the spectral region of interest in order to avoid absorption of the shorter wave lengths by the oxygen of the air.

The dye cyanide salt solution can be exposed to sunlight for a period of over two hours without producing substantial color.

Example 2

For actinometry of short-wave ultraviolet a $1 \times 10^{-4}$ molar solution of Pararosaniline Cyanide in 0.1 normal aqueous p-toluene sulfonic acid is used as the photosensitive liquid. In this case, the color formed in the test by heating with sodium acetate solution will be a red. Little or no transitory color may be formed during exposure of the solution to the ultraviolet radiation.

After exposure, the solution is mixed with an equal volume of 0.11 molar sodium propionate, heated to boiling, cooled, and held in the thermostat for one hour, as described in Example 1. The pararosaniline present in the solution is determined colorimetrically using light of about 5500 A. wave length.

As in Example 1, the method is best standardized by initial use of a calibrated lamp that yields the type of radiation being measured and by use of a standardized experimental technique of exposure.

This dye cyanide salt solution also can be exposed to sunlight for a period of at least two hours without appreciable color formation.

In the preceding examples, the solutions were dilute, requiring the use of long absorption cells and long exposures. Salts of the hydrophobic dye cyanides may also be used in more concentrated solution with shorter absorption cells and shorter exposures. But with the stronger solutions of salts of the hydrophobic dye cyandies, some unreacted dye cyanide base is precipitated by the admixture with sodium acetate or equivalent neutralizing solution. This is removed by filtration before the colorimetric determination of the dye present. The precipitated dye cyanide adsorbs some dye. Therefore, the use of stronger solutions of the salts of the hydrophobic dye cyanides gives most precise actinometric results in routine procedures where the percentage conversion of dye cyanide into dye runs about the same in all the determinations. Examples 3 and 4 illustrate such operation.

Example 3

An actinometric solution of $1.2 \times 10^{-3}$ molar Malachite Green Cyanide in aqueous 0.1 normal perchloric acid is exposed as in Example 1. The exposed solution is mixed with an equal volume of an aqueous solution containing 3.4 g. of sodium formate and 4.2 g. of sodium carbonate (anhydrous) per liter, heated to boiling, stored in the 25° thermostat for one hour, filtered, and the Malachite Green present in the filtrate determined colorimetrically by light having wave lengths near 6180 A.

Example 4

An actinometric solution of $1.2 \times 10^{-3}$ molar Crystal Violet Cyanide in aqueous 0.1 normal sulfuric acid is prepared. After exposure, the solution is mixed with an equal volume of aqueous 0.11 molar sodium butyrate, boiled, cooled, stored in the thermostat and filtered as in Example 3, and the Crystal Violet in the filtrate determined by light of 5900 A. approximate wave length.

When salts of water-soluble hydrophilic dye cyanides are used, the neutralizing solution does not precipitate the dye cyanide and no filtration is necessary. Also, the possibility of error from dye absorbed by the precipitated dye cyanide is eliminated. Thus, the Formyl Violet S4B Cyanide solution used in Example 1 may be stronger, or another hydrophilic dye cyanide may be used. Example 5 is illustrative of the use of hydrophilic dyes in more highly concentrated form.

Example 5

A $1.2 \times 10^{-3}$ molar solution of Ethyl Green Cyanide chloride (described in my copending application Serial Number 494,271, and now Patent No. 2,839,542) in aqueous 0.1 normal p-toluene sulfonic acid is prepared for use as the actinometric solution. This has a residual sensitivity to longer wave lengths that makes it especially useful for measuring wave lengths in the 2500–2900 A. range. But for the same reason, it should not be used in outdoor sunlight. After exposure, the solution is mixed with an equal volume of 0.11 molar sodium acetate solution, heated to boiling, cooled, kept in the thermostat for one hour, and the dye content determined by reddish-orange light.

The step of development of a final permanent color by neutralization of excess strong acid as in Examples 1 to 5, inclusive, may be obviated by replacing the water with a solvent that does not yield —OH⁻, —OR⁻ or similar ions capable of forming colorless derivatives, such as dye bases, of the triphenylmethane dyes. The liquid carboxylic acids are such solvents, and actinometric solutions of dye cyanide salts can be prepared in them. These solutions have sensitivity only to short-wave ultraviolet and develop immediate permanent colors on irradiation. Example 6 is illustrative.

Example 6

Just before use, a $2.5 \times 10^{-3}$ molar solution of Crystal Violet Cyanide is made up in 0.1 normal perchloric acid in acetic acid. This solution is insensitive to sunlight, but on irradiation with short-wave length ultraviolet develops a color that is yellow in dilute solution and greenish yellow in more concentrated solutions. This color is permanent, and the acid salt of Crystal Violet that causes it may be determined colorimetrically by violet light, e.g., 4100 A.

The actinometric solution of Example 6 is not stable indefinitely at room temperature because crystal violet perchlorate is little soluble in acetic acid and will begin to precipitate from a $10^{-3}$ solution within 12 to 24 hours.

The p-toluene sulfonates of the dye cyanides are more soluble in acetic acid, and p-toluene sulfonic acid may advantageously be used to replace the perchloric acid of Example 6. However, this solution should not be kept for many days before use because it may gradually become brown due to a decomposition of the dye cyanide in the very strong acid.

While systems employing nonaqueous solvents, such as acetic or propionic acid, produce on irradiation immediate nonfading colors, they have some disadvantages due to the ultraviolet absorption of the solvents themselves and some slow decomposition of the dye cyanides in the strongly acid solutions. It has been found that the advantages of direct permanent color formation from dye cyanide salts without the disadvantages of using a non-basic solvent may be obtained in aqueous solution by use of the salts of certain of the new hydrophilic dye cyanides.

Especially suitable for this use are the previously mentioned amino salts of dye cyanides containing a sulfonic acid group in the 2 position, i.e., ortho to the central methane carbon atom. On irradiation, salts of this group of hydrophilic dye cyanides immediately form colored solutions, and after a short period of adjustment after exposure, the colors either do not fade or fade so slowly as not to interfere with the use of the immediately formed color for actinometry. Example 7 illustrates the use of such salts in actinometry.

Example 7

$3 \times 10^{-4}$ molar solution of Erio Glaucine Cyanide in aqueous 0.1 N hydrochloric acid is exposed to sunlight and found to be quite insensitive. It is then exposed to ultraviolet of wave lengths shorter than 2550 A. and forms a green color. The color is not absolutely permanent, but fades much more slowly than the colors formed by intense irradiation of aqueous solutions of the salts of the hydrophobic dye cyanides. Thus, the fading is unimportant in the actinometric use of this solution for the measurement of moderate intensities of short-wave ultraviolet. After exposure, the solution is stored in the thermostat for one hour and the dye determined colorimetrically by 6300 A. light.

The dye cyanides having sulfonic acid groups in the 2 position not only form normal salts with sensitivity to short-wave ultraviolet, but also form well-defined monoacid, i.e., basic salts with distinctive spectral sensitivities, and these salts are formed at relatively low acidity. For example, Figure 10 shows the ultraviolet absorption spectra of Patent Blue V Cyanide in aqueous solution at pH 4 and pH 7. Both solutions are strongly photosensitive and yield a blue color on irradiation with ultraviolet of wave lengths absorbed by the solutions. However, the solution at pH 9 is sensitive to wave lengths as long as 3620 A. That of pH 4 is sensitive only to wave lengths shorter than 3100 A. and, therefore, quite insensitive to sunlight through window glass. Thus, solutions of the monoacid salts of Patent Blue V Cyanide have the advantage of being usable like the normal dye cyanide salts in sunlit rooms for actinometry of short-wave ultraviolet and the unique property of a considerable sensitivity to the region from 2700–2900 A., to which the normal dye cyanide salts are virtually insensitive. An example of the formation and use of the monoacid salt is as follows:

Example 8

A suitable actinometric solution of the monoacid salt of Patent Blue V Cyanide is made by dissolving 50 mg. of Patent Blue V Cyanide disodium salt in 45 ml. of water and adding 10% aqueous acetic acid to a pH of 3.8. On irradiation with radiant energy containing wave lengths shorter than 3100 A. the solution gives an immediate permanent blue color that may be determined colorimetrically by 6380 A. wave-length light.

The monoacid salt of Fast Acid Violet 10B Cyanide has the ultraviolet transmission spectrum shown in Figure 11 (curve B), which may be compared with the free-base form having the transmission spectrum shown in curve A. It will be seen in this case that the monoacid salt has a residual light absorption at wave lengths longer than 3600 A. This long wave-length light absorption is paralleled by a long wave-length photosensitivity that appears to be unique among the dye cyanide systems. Because of it, solutions of the monoacid salt of Fast Acid Violet 10B Cyanide are especially suitable for measurement of the total ultraviolet component of sunlight. Also because of the great concentration of energy in the longer wave lengths of the solar ultraviolet spectrum (shown, for example, by curve A, Figure 16, page 45 of "Applications of Germicidal, Erythemal and Infrared Energy" by Matthew Luckiesh (1946)), solutions of the monoacid salt of Fast Acid Violet 10B Cyanide are especially suitable for demonstrating the photochemical effects of sunlight as well as for measuring the long-wave ultraviolet component. The following example is illustrative:

Example 9

A suitable actinometric and demonstration solution is made by dissolving 10 mg. of Fast Acid Violet 10B Cyanide (the cyanide of the dye Fast Acid Violet 10B having the Colour Index No. 696) free acid in 50 ml. of boiling water, cooling the solution to 25° C. and adding 10% aqueous benzene sulfonic acid to a pH of 3.0. On exposure to sunlight, the solution develops a violet blue color that does not fade in the dark.

The utilization of the unique photochemical properties of dye cyanide salts is, of course, not confined to liquid solutions. Photosensitive films that have the characteristic spectral sensitivity of the dye cyanide salts are useful for the detection of short-wave ultraviolet, e.g., 2537 A. in a room already brightly illuminated by sunlight, incandescent or fluorescent lamps, or all together, and for locating the areas on ceilings, walls, desks or other parts of the room which are irradiated by the short-wave ultraviolet—as in germicidal lamp installations where it is important that the 2537 A. should not shine in the eyes of occupants of a room. Such photosensitive films also are useful in spectroscopy, etc. Example 10 is illustrative of the preparation and use of such a photosensitive film.

Example 10

A film is prepared by mixing at 70° C. 7.5 ml. of a 20% aqueous solution of gelatin with 0.25 ml. of 85% U.S.P. lactic acid, 5 ml. of aqueous 1% Patent Blue V Cyanide disodium salt and water to a total volume of 20 ml. The monoacid salt of the dye cyanide is formed in the acid solution. Paper or glass plate is coated with this mixture, using 1 ml. for 2 square inches of surface, and the films allowed to gel and set at room temperature. The coated materials are exposed as soon as the gelatin has set and while still moist; or they may be stored moist in a closed container for future use. In the latter case, it is desirable to add 2 drops of 96% phenol to the coating solution to inhibit the growth of mold.

When photographic materials prepared in this way are exposed to a mercury-arc spectrum, the short wave-length lines print strongly, with also a faint image of 3026 A., but none of the longer wave-length lines color the material. The printed image is blue. The printed film may be dried to form a permanent record. However, the dried film should be protected from longer wave-length ultraviolet because it is somewhat sensitive to longer wave lengths, due, perhaps, to a loss of hydrogen ion activity accompanying the removal of the water.

It will be understood that, in some instances, it may be desirable to combine more than one of the dye cyanide compounds as disclosed herein to take advantage of the special characteristics of such combination, such as provision of different colors or hues on photolysis, preferential response to different wave lengths so as to produce different color tones at different wave lengths, differences in printing speed, and the like.

The present application is a continuation-in-part of my copending applications Serial Number 542,479, filed October 24, 1955, now Patent No. 2,855,303; Serial Number 547,338, filed November 16, 1955, now Patent No. 2,829,052, issued April 1, 1958; and Serial Number 550,773, filed December 2, 1955, now abandoned.

I claim:

1. A photochemical process comprising exposing a system containing a colorless amine addition salt composed of an acid combined with at least one para-amino group of a para-amino triphenylacetonitrile and a photoactivator for said salt to ultraviolet energy of a wave length absorbed by said salt to cause a photochemical reaction to take place, said system being substantially free of the basic form of said para-amino triphenylacetonitrile, and forming a substantially permanent colored compound from said irradiated and photochemically reacted salt.

2. The process of claim 1 wherein said amine addition salt is the normal salt of a para-amino triphenylacetonitrile having more than one para-amino group.

3. The process of claim 1 wherein said amine salt is a mono-amine salt of a para-amino triphenylacetonitrile having more than one para-amino group.

4. The process of claim 1 wherein the salt of the para-amino triphenylacetonitrile is exposed to ultraviolet energy in a nonaqueous activator medium free of hydroxyl ions whereby a substantially permanent color is formed directly.

5. The process of claim 1 wherein the salt is composed of an acid and a para-amino triphenylacetonitrile of the type which readily forms a carbinol by reaction with water and said salt is exposed to ultraviolet energy in the presence of an acid medium including an activator selected from the group consisting of water, hydrocolloids, and alcohol to thereby form by photolysis a colorless dye intermediate, and said dye intermediate is then converted into a colored compound by raising the pH of said acid medium, said acid medium initially having sufficient acidity to prevent decomposition of said salt.

6. The process of claim 1 wherein said photosensitive para-amino triphenylacetonitrile is a hydrophobic compound and is rendered hydrophilic through conversion into said amine salt.

7. The process of claim 4 wherein said salt of the photosensitive para-amino triphenylacetonitrile is exposed to ultraviolet energy in the presence of a carboxylic acid activator and a colored compound is formed directly by photolysis.

8. A photochemical process comprising exposing an aqueous acid solution having a pH no higher than about 1.0 and containing a photosensitive para-amino triphenyl-acetonitrile in the form of its normal amine addition salt to ultraviolet energy including wave lengths absorbed by said normal salt to thereby form a colorless dye intermediate, and converting said intermediate into a colored compound by raising the pH of said solution to at least about 3.0.

9. A process for determining the presence of short wave ultraviolet in the presence of longer wave-length radiation comprising exposing a normal amine salt composed of an acid combined with the para-amino group of a para-amino triphenylacetonitrile in an acid system containing a photoactivator for said salt and substantially free of the basic form of said para-amino triphenylacetonitrile to ultraviolet energy and testing the resulting exposed material to determine whether photolysis has occurred, said acid system having sufficient acidity to prevent decomposition of said amine salt.

10. The process of claim 9 wherein after exposure of said acid salt the acid system is at least partially neutralized to insure color formation and the extent of photolysis is determined colorimetrically.

11. The process of claim 9 wherein said para-amino triphenylacetonitrile is the cyanide of Formyl Violet S4B, Colour Index No. 698.

12. The process of claim 9 wherein said para-amino triphenylacetonitrile is a dye cyanide of the hydrophobic type.

13. The process of claim 9 wherein said salt is employed in a nonaqueous liquid carboxylic acid system, a color is formed directly by photolysis of the salt upon exposure of the system to short wave-length ultraviolet, and the extent of photolysis is determined colorimetrically.

14. The process of claim 9 wherein said salt is the normal amine salt of a para-amino triphenylacetonitrile having a sulfonic acid group on a phenyl nucleus at a position ortho to the central methane carbon atom, said salt is utilized in an acid medium including a photoactivator selected from the group consisting of water, hydrocolloids, and alcohol, and said exposed salt directly forms a colored compound when exposed to short wave ultraviolet energy, said acid medium having sufficient acidity to prevent decomposition of said amine salt.

15. A process for measuring substantially the total ultraviolet component of sunlight comprising exposing the monoacid salt of the cyanide of Fast Acid Violet 10B, Colour Index No. 696, to sunlight in the presence of a photoactivator for said salt and measuring the amount of color formation.

16. A photosensitive product comprising a supporting base having a coating applied thereto, said coating containing an amine salt composed of an acid combined with at least one para-amino group of a para-amino triphenylacetonitrile and a photoactivator for said salt; said coating being substantially free of the basic form of said para-amino triphenylacetonitrile.

References Cited in the file of this patent

UNITED STATES PATENTS

| | | |
|---|---|---|
| 2,350,330 | Remy | June 6, 1944 |
| 2,441,561 | Chalkley | May 18, 1948 |
| 2,540,780 | Gabel et al. | Feb. 6, 1951 |
| 2,743,223 | McClinton et al. | Apr. 24, 1956 |
| 2,800,589 | Levy | July 23, 1957 |